US008286220B2

(12) United States Patent
Forristal (10) Patent No.: US 8,286,220 B2
(45) Date of Patent: Oct. 9, 2012

(54) BROWSER ACCESS CONTROL

(75) Inventor: Jeff Forristal, Elizabethton, TN (US)

(73) Assignee: Zscaler, Inc., San Jose, CA (US)

( * ) Notice: Subject to any disclaimer, the term of this patent is extended or adjusted under 35 U.S.C. 154(b) by 1051 days.

(21) Appl. No.: 12/236,251

(22) Filed: Sep. 23, 2008

(65) Prior Publication Data

US 2010/0077444 A1      Mar. 25, 2010

(51) Int. Cl.
*G06F 21/00* (2006.01)
(52) U.S. Cl. ......... 726/1; 726/2; 726/3; 726/22; 726/23; 726/24; 726/25; 726/27
(58) Field of Classification Search .................. 726/1–3, 726/22–25, 27; 709/229
See application file for complete search history.

(56) References Cited

U.S. PATENT DOCUMENTS

| | | | | |
|---|---|---|---|---|
| 5,903,732 | A | * | 5/1999 | Reed et al. ................... 709/229 |
| 6,311,269 | B2 | * | 10/2001 | Luckenbaugh et al. ...... 713/154 |
| 2002/0162003 | A1 | | 10/2002 | Ahmed |
| 2005/0187890 | A1 | | 8/2005 | Sullivan |
| 2006/0075490 | A1 | * | 4/2006 | Boney et al. .................... 726/22 |
| 2006/0075500 | A1 | * | 4/2006 | Bertman et al. ................ 726/24 |
| 2007/0180493 | A1 | * | 8/2007 | Croft et al. ......................... 726/2 |
| 2007/0204044 | A1 | * | 8/2007 | Rice et al. ..................... 709/225 |
| 2008/0066150 | A1 | * | 3/2008 | Lim ................................. 726/1 |
| 2008/0091682 | A1 | * | 4/2008 | Lim ................................. 707/9 |
| 2008/0281943 | A1 | * | 11/2008 | Shapiro ......................... 709/218 |
| 2008/0301765 | A1 | * | 12/2008 | Nicol et al. ....................... 726/1 |

OTHER PUBLICATIONS

"Network Access Control," Wikipedia, the free encyclopedia, pp. 1-3, [on-line] http://en.wikipedia.org/wiki/Network_Access_Control, [retrieved Sep. 22, 2008].

* cited by examiner

*Primary Examiner* — Kambiz Zand
*Assistant Examiner* — Tongoc Tran
(74) *Attorney, Agent, or Firm* — Clements Bernard PLLC; Lawrence A. Baratta, Jr.; Christopher L. Bernard (57) ABSTRACT

Systems, methods and apparatus for a distributed security that monitors communications to manage client browser network access based upon the browser configuration of the client browser by use of a configuration script executed in the browser environment. Such management can reduce the exposure of potentially vulnerable client browsers to domains associated with malicious activity.

20 Claims, 5 Drawing Sheets

FIG. 4

BROWSER ACCESS CONTROL

BACKGROUND

This disclosure relates to controlling network access.

Reducing nefarious access to protected computer systems is of paramount concern given the prevalence of and significant reliance on such systems. One conduit employed to gain unauthorized access to a protected system is via a client browser residing within the protected system. For example, in response to an HTTP request from a client browser within the protected system, a source external to the protected system may provide content to the client browser. The provided content may contain malicious code capable of exploiting vulnerabilities associated with the client browser to gain access to the protected system or otherwise collect sensitive data stored on the client device running the browser.

Client browser and third party developers continually strive to eliminate vulnerabilities associated with browsers by releasing new browser versions and security patches, providing anti-virus software, and otherwise bolstering the security of the browsers. However, these measures are of little effect if they are not implemented.

Other solutions include network access control (NAC) solutions. One NAC solution is an agent-based, in which an agent is installed on a client device. When a user connects to a network, a NAC system remotely requests health status of the client device from the agent. If the health of the agent does not meet an access policy requirement, access to the network is precluded. Another NAC solution does not require an agent. Such a solution remotely scans a client device to assess the health of the device.

NAC solutions, whether agent-based or not, are often implemented in the same network environment as the client device and are of limited utility in scanning a device through a firewall or through some other network access translation (NAT).

SUMMARY

In general, the subject matter of this application relates to controlling network access based on the configuration of the client browser initiating the network access request.

One aspect of the subject matter described in this specification can be embodied in a method that includes the actions of receiving at a processing node a request for a domain from a client browser; determining at the processing node whether the request for the domain includes browser authorization data; if the request for the domain includes the browser authorization data, then allowing the request; if the request for the domain does not include the browser authorization data, providing a configuration page to the client browser, the configuration page including a configuration script that in response to execution at the client browser generates browser configuration data, the browser configuration data defining a browser configuration of the client browser; receiving the browser configuration data from the client browser; comparing the browser configuration data to security policy data associated with the client browser; determining whether the browser configuration data complies with the security policy data based on the comparison; and if the browser configuration data complies with the security policy data, providing the browser authorization data to the client browser.

Another aspect of the subject matter described in this specification can be embodied in methods that include the actions of providing from a client browser a request for a domain to a processing node; in response to the request, receiving at the client browser a configuration page including a configuration script; executing at the client browser the configuration script to generate browser configuration data, the browser configuration data defining a browser configuration of the client browser; comparing at the client browser the browser configuration data to security policy data associated with the client browser; determining at the client browser whether the browser configuration data complies with the security policy data based on the comparison; and if the browser configuration data complies with the security policy data, providing security policy compliance data to the processing node.

Optional advantages can be realized according to these aspects. A browser-based access control solution can be used that does not require a client resident agent and provides a solution that is transparent to network address translation operations. The browser access control solution can be implemented external to the protected system, such as at a proxy server. The browser access control solution can also be implemented with or within an authentication process instead of requiring a separate assessment after an authentication. Realization of any of these advantages depends on the particular implementation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Access by client browsers residing within a protected system to domains external to the protected system are controlled based on a browser configuration of the client browser. Information about the browser configuration of the client browser can be used to determine or infer client browser vulnerabilities. For illustrative purposes consider that a new browser version of a browser application has been released to combat a particular known virus threat. A client browser based upon an outmoded browser version would be susceptible to the virus threat whereas a client browser based upon the new browser version would not.

In some implementations, in response to a domain request from a client browser, a configuration page, e.g., an HTML-based web page, containing a configuration script is delivered to the client browser. Upon receipt, the client browser executes the configuration script thereby generating browser configuration data defining the browser configuration of the client browser. The browser configuration data is used to determine vulnerabilities of the client browser. Based upon the browser configuration data and security policies of the protected network, the domain request may be allowed or denied.

§2.0 Example High Level System Architecture

Figure 1:
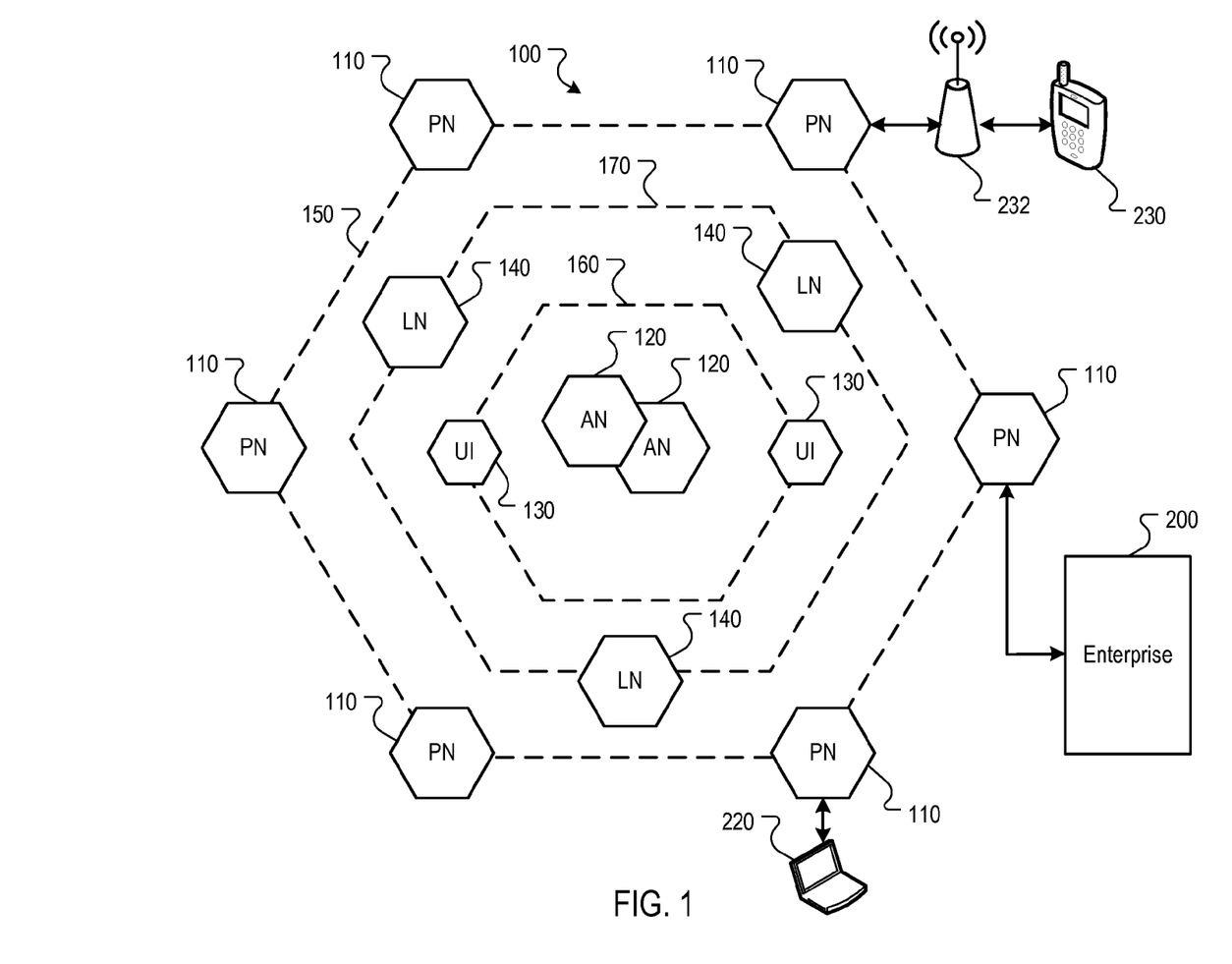
FIG. 1 is a block diagram of a distributed security system.

One environment, among others, in which the above-described access control method can be employed, is shown in FIG. 1, which is a block diagram of a distributed security system 100. The system 100 can, for example, be implemented as an overlay network in a wide area network (WAN), such as the Internet. The system 100 includes content processing nodes 110 that can, in part, monitor domain requests from client browsers associated with an external system, i.e., protected network, and preclude such requests if the browser configuration of the requesting client browser, as indicated by the browser configuration data generated by the execution of the configuration script, does not meet security policy strictures. Example external systems can include an enterprise 200, a computer device 220, and a mobile device 230, or other network and computing systems. A distributed security system such as this ensures that all enterprise traffic, such as a request for a domain, is available for inspection. Such a solution prevents client browsers from accessing domain content that may exploit client browser security vulnerabilities to gain unauthorized access to the external system.

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is processed through a processing node 110.

Each processing node 110 can identify a threat classification, e.g., clean, spyware, malware, undesirable content, innocuous, unknown, etc., by use of data inspection engines in the processing node 110. Based on the threat classification, the processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communicate with the nearest processing node 110 through any available wireless access device 232, such as an access point, or a cellular gateway. A single computer device 220, such as a consumer's personal computer, may have its browser, e-mail program or any other network capable application configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, client browser configuration standards, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 120 can serve as an application layer 160. The application layer 160 can, for example, manage and provide policy data, threat data, and data inspection engines and dictionaries for the processing nodes 110.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, whether client browsers having certain client browser configurations are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocol (IPSec), or other protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected.

In another transparent proxy mode example, a protected system, such as the enterprise 200, may identify a processing node 110 as a next hop router for communication with the external servers.

§3.0 Example Detailed System Architecture and Operation

Figure 2:
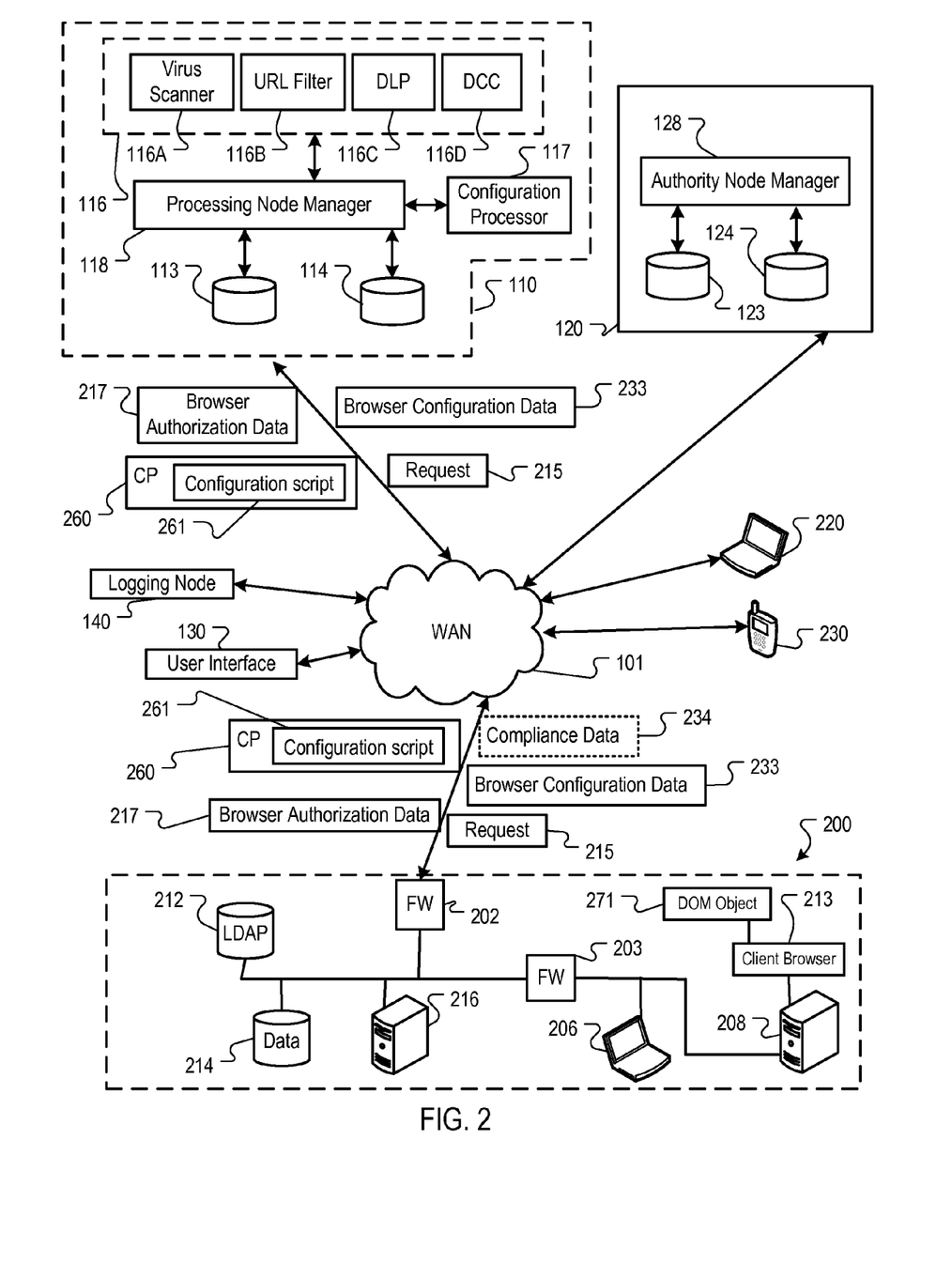
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120, user interface 130, and logging node 140 are illustrated, there can be many of each of the component nodes 110, 120, 130, and 140 present in the system 100.

A wide area network (WAN) 101, such as the Internet, or some other combination of wired and/or wireless networks, connects in data communication the processing node 110, authority node 120, user interface 130, and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 216, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 212 may store, for example, user login credentials for registered users of the enterprise 200 system. Such credentials can include user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the enterprise server 216 of the enterprise 200, or to some other secured data provider server.

One or more of the external systems 200, 220, and 230 may have one or more computing systems running client browsers, e.g., a web browsing application running on a computer within an external system, for accessing network resources both within and outside of the external system. For example, user computer 208 in enterprise 200 may include a client browser 213, such as Internet Explorer®, Firefox®, or some other browser application for accessing Internet content. The client browser 213 has browser configuration attributes such as browser application version, browser version build, associated plugins and plugin versions, etc.

§3.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store threat data 114 to facilitate the decision of whether a content item should be processed for threat detection.

A processing node manager 118 can manage each content item in accordance with the security policy data 113 and the threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system (e.g., security system 100 of FIG. 1), can be analyzed to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 116B that can classify a URL address as allowed or restricted, a data leakage protection (DLP) engine 116C that can identify a content item as secure or leaking, and a dynamic content categorization (DCC) engine 116D that can classify a content item as passed or failed.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

The processing node 110 can also include a configuration processor 117 capable of examining the content of domain requests 215, e.g., an HTTP request, and data, e.g., a token, transmitted with the request 215. For example, the configuration processor 117 and the processing node manager 118 can examine a domain request 215 transmitted from a browser, such as the client browser 213, to determine if the request includes browser authorization data 217 and/or browser configuration data 233. Allowance or denial or the request 215, and the instantiation of one or more remedial actions, is conditioned on the absence or presence of the browser authorization data 217 or the browser configuration data 233. The processing is described in more detail in Section 4 below.

§3.2 Example Authority Node Architecture

In general, the authority node 120 includes a data store that stores master security policy data 123 for each of the external systems 200, 220 and 230 and users of those systems. An authority node manager 128 can be used to manage the master security policy data 123, e.g., receive input from users of each of the external systems defining different security policies, and can distribute the master security policy data 123 to each of the processing nodes 110. For example, the master security policy data 123 may include data describing browser configuration parameters, e.g., browser application version, version build number, types and versions of browser plugins, antivirus software associated with the browser, etc. The processing nodes 110 then store a local copy of the security policy data 113.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing node 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each processing node 110, the authority node 120 can redirect traffic among processing nodes 110 and/or balance traffic among the processing nodes 110. Other remedial actions and processes can also be facilitated by the authority node 120.

§3.3 Example Processing Node and Authority Node Communications

The processing node 110 and the authority node 120 can be configured according to one or more push and pull processes to manage content items according to security policy data 113 and/or 123 and the threat data 114 and/or 124.

§4.0 Managing Domain Requests to Identify Potentially Vulnerable Client Browsers In some implementations, domain requests 215, such as an HTTP request that includes a Uniform Resource Locator (URL), provided by a client browser 213 are interrogated by the processing node 110 to determine whether the request 215 can be allowed. For example, the domain request 215 may be allowed if the request 215 is submitted by a client browser 213 authorized to communicate with domains external to the enterprise 200.

The processing node 110 is capable of determining the authorization status of a client browser 213 based upon the content of the domain request 215 and/or data transmitted in addition to and with the domain request 215. For example, browser authorization data 217 are included with the request 215 if the browser 213 has been determined to be in compliance with security policy requirements and a user of the browser has presented valid login credentials.

If the request 215 does not include browser authorization data 217, then the processing node manager 118 initiates a login process. In response the processing node manager 118 (or some other entity running the login process) receiving valid login credentials from the client browser 213, the configuration processor 117 provides a configuration page (CP) 260 having a configuration script 261 to the client browser 213. Execution of the configuration script 261 causes the client browser 213 to provide the configuration data 233 to the configuration processor 117.

The configuration processor 117 compares the browser configuration data 233 to the securities policies enumerated in the policy data 113 to determine whether the browser 213 meets the configuration requirements defined in the policy data 113, i.e., whether the browser is "up to date."

If the configuration processor 117 determines that the browser 213 is up to date, then the request is allowed. In response, the processing node manager 118 provides the browser authorization data 217 to the client browser 213, and the browser authorization data 217 is thereafter included in subsequent requests, such as in the form of a browser cookie. Upon receiving subsequent requests that include the browser authorization data 217, the processing node manager 118 can strip the browser cookie from the request and allow the request to proceed to the requested domain.

Conversely, if the configuration processor 117 determines that browser 213 is not up to date, then any number of remedial operations can be performed by the configuration processor 117. Example remedial operations can include providing an automatic update to the browser 213 and associated components; or determining the necessary updates to bring the browser 213 into compliance and notifying the user or an information technology specialist; or providing the user a policy information page that includes information about a company's security policy and why the browser request 215 is being denied.

In some implementations, separate user authentication data can be provided to the client browser 213 in response to the client browser 213 providing valid user credentials. The provisioning of the user authentication data separately from the browser authorization data 217 obviates the need to repeat a login process if the client browser 213 does not meet the configuration requirements and subsequent updates are required. In other words, the separate provisioning of the user authentication data allows for the client browser 213 to communicate with at least the processing node 110 and entities or agents of the distributed security system 100 and also allows for the processing node 110 to stop the request 215 from being transmitted beyond the security system 100.

In other implementations, the user authentication data can be included as separate data in the browser authorization data 217, e.g., data indicating that the user of the client browser 213 presented valid credentials.

§4.1 Processing Node Management Activities

Figure 3A:
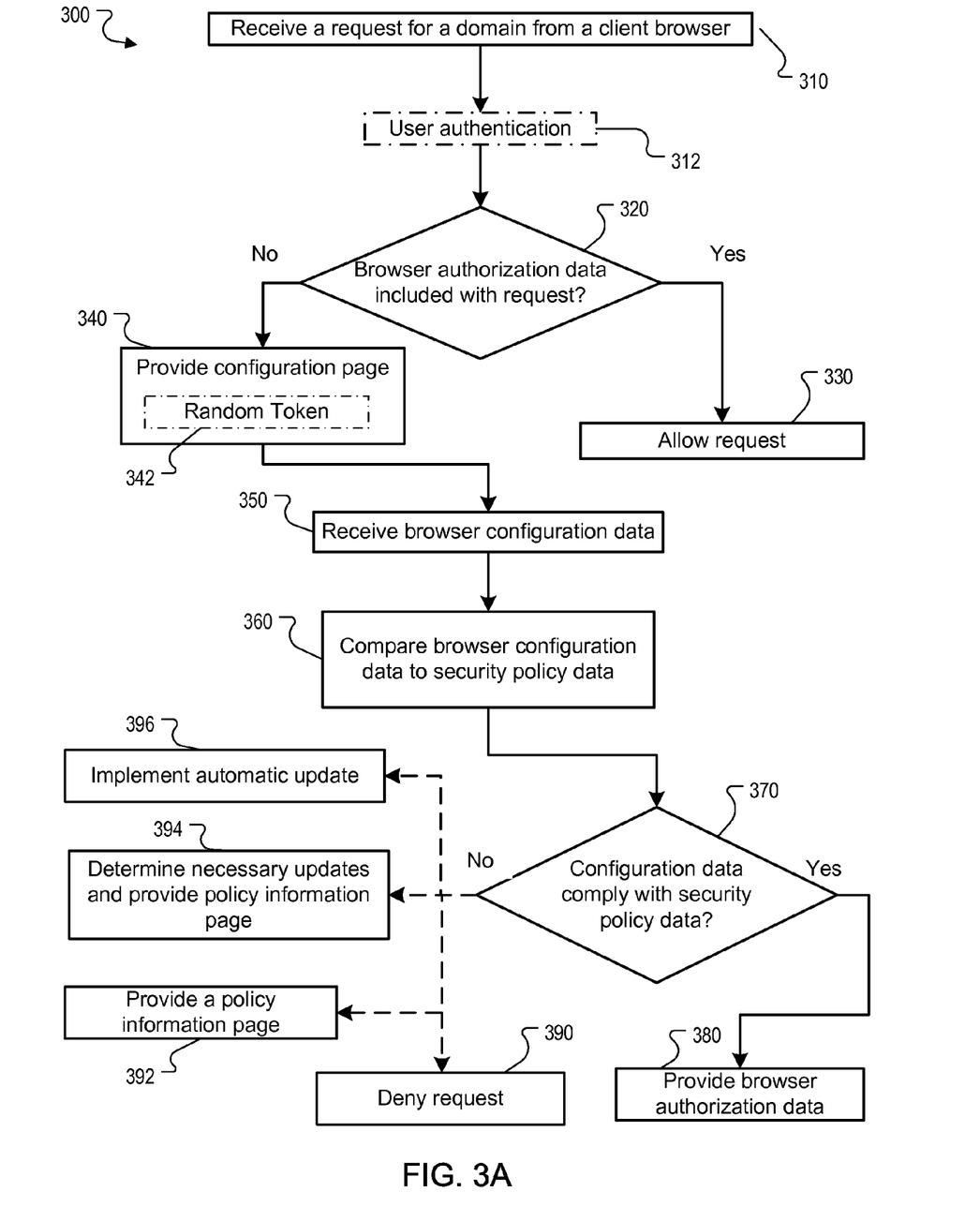
FIGS. 3A and 3B are example flow diagrams of a process for the management of a request for a domain by the processing node.
Figure 3B:
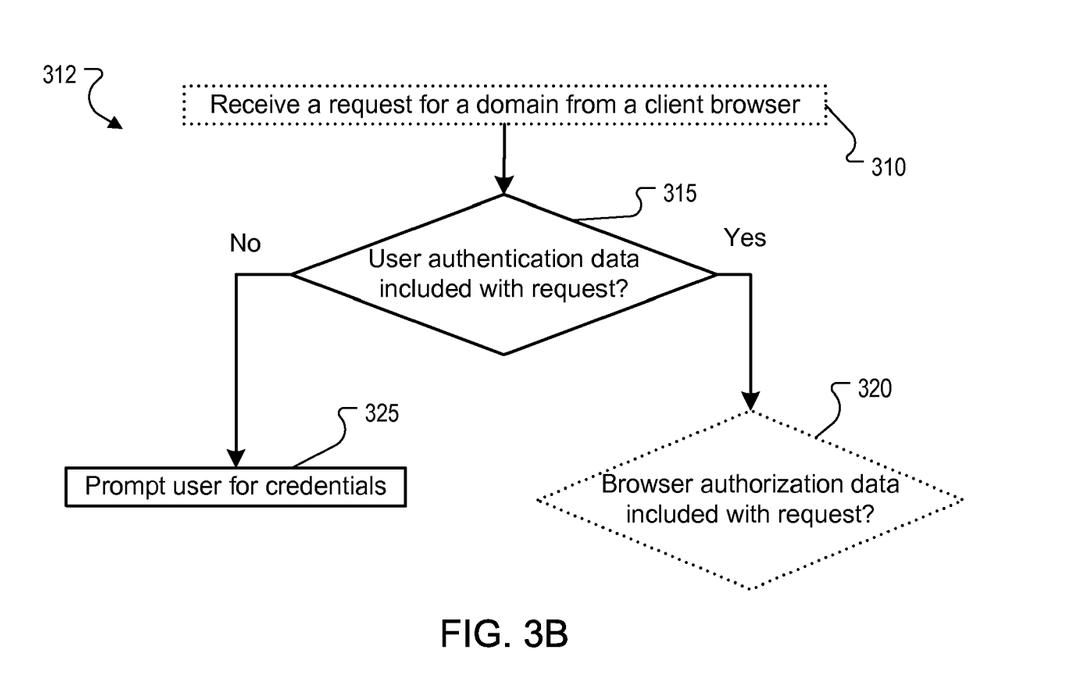

FIGS. 3A and 3B are example flow diagrams of a process 300 for the management of a request for a domain by the processing node. A request is received for a domain from a client browser (310). For example, the processing node 110 receives the domain request 215 for a domain (from the client browser 213). The request 215 may be an HTTP request that includes a URL.

In some implementations, after receiving the request, an optional user authentication process 312 can be initiated, which is described with reference to FIG. 3B. During the optional user authentication process 312, the request is processed to determine whether user authentication data is included with the requests (315). For example, the processing node 110 determines whether the domain request 215 includes user authentication data, either as a separate query parameter or included with the browser authorization data 217. The presence of the user authentication data indicates that the user has provided user credentials that have been validated/authenticated and been granted access permission from the enterprise.

If the request does not include user authentication data, then the user is prompted to provide credentials (325). For example, the processing node 110 prompts the user, via the client browser 213, to provide user credentials. Once the user credentials are received, the processing node 110 can then compare the user credentials with user authentication information contained in the policy data 113, or in separate login data.

In other implementations, upon receipt of the domain request 215 from an unauthenticated user, the processing node 110 can redirect the request to the authority node 120 or to an authentication resource in the enterprise (e.g. LDAP server 212 of FIG. 2) for validation of the user credentials.

If the provided user credentials are validated/authenticated, the user credentials are associated with user authentication data indicating that the user is authorized to access the enterprise and submit domain requests, exclusive of other security requirements. Subsequent the user authentication process, domain requests initiated by the user can include the user authentication data, e.g., as a separate user authentication token or query parameter, or included in the browser authorization data 217, to inform the processing node that the user has been authenticated. If the provided user credentials are not validated/authenticated, then the processing node 110 denies deny the domain request.

If the authorization process is not used, or if the request includes user authentication data, then the request is processed to determine whether the request for the domain includes browser authorization data (320). For example, the configuration processor 117 can determine if the request 215 includes browser authentication data 217. The presence of browser authorization data 217 indicates that the browser configuration data 233 of the requesting client browser complies with security policy data 113 and is authorized to communicate with domains external to the protected system (subject to policies defined in the policy data 113).

If the domain request includes browser authorization data, the request is allowed (330). For example, the configuration processor 117 can allow the request 215 if the request 215 include includes browser authorization data 217. The browser authorization data 217 is removed from the domain request 215 prior to transmitting the request 215 to the destination domain.

If, however, the domain request does not include browser authorization data, then a configuration page is provided to the client browser (340). For example, the configuration processor 117 provides an HTML-based configuration page 260 that includes a configuration script 261 (e.g., configuration script 261 of FIG. 2) that is executed by the client browser 213 upon receipt. The configuration script 261 may be composed with a scripting language, such as JavaScript.

The configuration script 261 includes instructions, that when executed by the client browser 213, cause the client browser 213 to gather and provide information about the client browser 213 by, for example, querying specific HTML DOM (Document Object Model) objects, e.g., DOM object 271 of FIG. 2, accessing browser client capability information, enumerating installed plugins and MIME (Multipurpose Internet Mail Extensions) types, checking for resources associated with known browser extensions, etc. The information collected in response to executing the configuration script 261 is the browser configuration data 233 that describes the configuration of the client browser 213.

For example, the instructions can cause the client browser to return the type of client browser application, e.g., Internet Explorer®, Firefox®; the software version of the browser; the build of the software version; the operating system in which the client browser is working; plugins and plugin version information associated with the client browser; type and version information for any antivirus software associated with the client browser, etc. The browser configuration data 233 may include some or all of the results returned from the execution of the configuration script 261.

The browser configuration data are received from the client browser (350). For example, the configuration processor 117 can receive the browser configuration data 233 from the client device. In some implementations, the browser configuration data 233 can be transmitted as a query parameter in response to an instruction in the configuration page 260 or the configuration script 261.

The browser configuration data are compared to security policy data (360). For example, the configuration processor 117 compares the received browser configuration data 233 to acceptable browser configuration levels defined in the security policy data 113. The acceptable browser configuration levels describe a browser configuration that minimizes the potential for exploitation of the client browser 213. For example, the configuration processor 117 compares the browser software version of the client browser as reported in the browser configuration data 233 to the most current version of the browser software available as reported in the security policy data 113.

The comparison is determinative of whether the browser configuration data comply with the security policy data (370). For example, the configuration processor 117 can determine whether the browser configuration data 233 comply with the security policy data 113.

If the browser configuration data is in compliance with the security policy data (indicating that the browser configuration of the client browser is in compliance with the security policies of the enterprise), then browser authorization data is provided to the client browser (380). For example, the configuration processor 117 provides the browser authorization data 217 to the client browser 213 if browser configuration data 233 is in compliance with the security policy data 113. The browser authorization data 217 can be transmitted to the client browser 213, e.g., as a token, and the client browser 213 can thereafter provide the browser authorization data 217 with subsequent requests as a browser cookie.

Subsequent requests for a domain from an authorized client browser 213 provided to the processing node 110 can be allowed by the processing node 110 without further browser authorization processes. In various implementations, the browser authorization data 217 can be valid for only the current browsing session; or, a predetermined length of time; or a predetermined number of domain requests; or until the current user logs off of the enterprise; or until a domain request is denied based upon another security measure.

If the browser configuration data does not comply with the security policy data, then one or more remedial processes can be initiated (390, 392, 394 or 396).

For example, the processing node 110 can deny the request (390). Alternatively, the configuration processor 117 can provide a policy information page having compliance instructions for the client browser (392). The policy information page may be an HTML-based web page delivered by the processing node to the client browser having instructions for a user of the client browser explaining the steps necessary to bring the configuration of the client browser, and hence the browser configuration data, in line with the security policies of the enterprise.

In another implementation, the configuration processor 117 can determine the updates needed to bring the client browser in compliance with the security policy data (394). The configuration processor 117 can provide a policy information page to the client browser that includes the updates, identified above, for security policy data compliance. For example, if the configuration processor 117 determines that the client browser 213 is associated with a browser plugin having a plugin version that is not in compliance with a security policy, the policy information page may include a link with the security system 100, e.g., to a URL of the processing node, at which the required version of the plugin can be downloaded and installed. Alternatively, the page can include executable instructions or directions to remove the plugin.

In another implementation, the configuration processor 117 can implement an automatic update (396). The automatic update includes necessary updates to bring the configuration of the client browser 213 in compliance with the security policy of the enterprise. For example, the configuration processor 117 can direct the client browser 213 to an update page hosted by the processing node 110, which includes an update script that the browser automatically executes to obtain and install the necessary updates.

In some implementations, a random token is provided to the client browser with the configuration page (342). For example, the configuration processor 117 can generate a random token by use of any suitable pseudo-random processing technique and provide the random token with the configuration page 260. The random token is used by the configuration processor 117 to detect and prevent the client browser 213 from communicating with external domains and providing predetermined false browser configuration data to the processing node 110. Subsequent to the execution of the configuration script 261 and generation of the browser configuration data 233 by the client browser 213, the processing node 110 receives the browser configuration data 233 and the token. If the browser configuration data 233 complies with the security policy data 113 and the returned token matches the randomly generated token provided with the configuration page 260 (i.e., the token is authenticated), the configuration processor 117 provides browser authorization data 217 to the client browser 213. If the returned token does not match the randomly generated token originally provided to the client browser 213, then the configuration processor 117 can deny the request or take other corrective action, e.g., resend the randomly generated token 342 and the configuration page 260.

§4.2 Client Browser Activities Associated with a Domain Request

Figure 4:
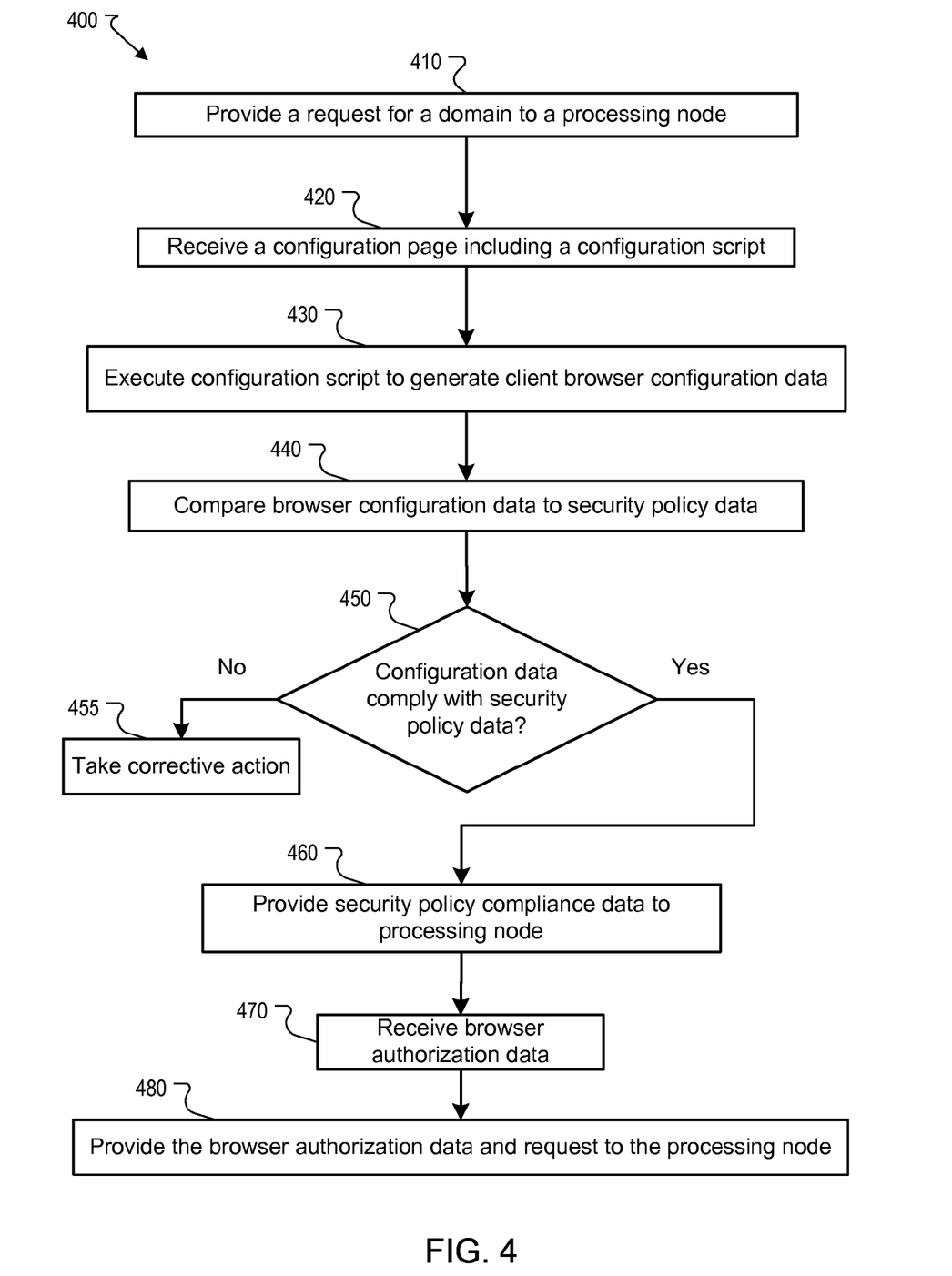
FIG. 4 is an example flow diagram of a process on the client browser for initiating domain requests and managing subsequent communications related to the request.

FIG. 4 is an example flow diagram of a process 400 on the client browser for initiating domain requests and managing subsequent communications related to the request. In the process 400 of FIG. 4, the decision as to whether the client browser is at an acceptable configuration can be made at the client instead of the processing node.

A request for a domain is provided by a client browser to a processing node (410). For example, a browser 213 can provide a request 215 to the processing node 110.

In response to the request, a configuration page including a configuration script is received by the client browser (420). For example, the configuration page 260 may be received by the browser 213 from the processing node 110.

In response to the receipt of the configuration page, the configuration script is executed by the client browser causing the client browser to generate browser configuration data defining the browser configuration of the client browser (430). For example, the configuration page 260 is automatically loaded by the client browser 213 and the configuration script 261 is executed, and browser configuration data 233 are generated.

The browser configuration data are then compared to security policy data for the enterprise (440). For example, the client browser 213 compares the generated browser configuration data 233 to acceptable browser configuration levels enumerated in the security policy data 113 to determine the susceptibility of the browser 213 to exploitation. The comparison between the browser configuration data 233 and the security policy data 113 is similar to the process detailed above in Section 3.1; however, the comparison is made at the client device. For example, the client device may receive security policy data from the processing node 110 in response to a query or as part of the configuration script 261.

The comparison is determinative of whether the browser configuration data comply with the security policy data (450). The comparison can be similar to the process described above in Section 3.1, except that the comparison is done by the client browser 213.

If the browser configuration data are in compliance with the security policy data, then security policy compliance data are provided to the processing node (460). For example, the client browser 213 can generate security policy compliance data 234 by use of the configuration script 216 and provide the security policy compliance data 234 to the processing node 110. The security policy compliance data 234 can, for example, be a binary indication of whether the browser is at an acceptable configuration. Additional detail can also be sent to the processing node with the security policy compliance data 234, including the browser configuration data.

In response to the security policy compliance data being provided to the processing node, browser authorization data are received by the client browser (470). For example, the client browser 213 receives the browser authorization data 233 from the processing node 110.

Thereafter, the browser authorization data are provided with subsequent requests to the processing node (480). For example, the client browser 213 can provide the browser authorization data 233 with each subsequent request 215. Excluding other security measures, if any, the processing node 110 can then direct the request 215 to the destination domain, optionally after the browser authorization data 217 has been removed from the request 215.

If the browser configuration data are not in compliance with the security policy data, then any number of corrective actions can be taken (455). For example, a message may be displayed on the browser 213 to the user of the browser 213 informing the user that the browser configuration of the browser 213 is not up to date.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer implemented method, comprising:
receiving at a processing node a request for a domain from a client browser, wherein the processing node is external to a protected network comprising the client browser and is part of a distributed security system, and wherein the domain is external to the protected network and separate from the processing node;
determining at the processing node whether the request for the domain includes browser authorization data indicative of an acceptable browser configuration level to minimize exploitation of the client browser;
if the request for the domain includes the browser authorization data, then allowing the request;
if the request for the domain does not include the browser authorization data, then:
provided a configuration page to the client browser, the configuration page including a configuration script that in response to execution at the client browser generates browser configuration data, the browser configuration data defining a browser configuration of the client browser;
receiving the browser configuration data from the client browser;
comparing the browser configuration data to security policy data associated with the client browser, the security policy data defining a security policy associated with the browser configuration of the client browser;
determining whether the browser configuration data complies with the security policy data based on the comparison; and if the browser configuration data complies with the security policy data, then providing the browser authorization data to the client browser.

2. The method of claim 1, wherein the browser configuration data includes browser version data of the client browser.

3. The method of claim 1, wherein the browser configuration data includes browser plugin data associated with the client browser.

4. The method of claim 3, wherein the configuration script is configured to query an HTML DOM object associated with the client browser and associate the results of the query with the browser configuration data.

5. The method of 1, further comprising:
if the request for the domain includes the browser authorization data, then:
removing the browser authorization data before the request for the domain is allowed; and
redirecting the request to the domain.

6. The method of claim 1, wherein the request for the domain is a request for a URL.

7. The method of claim 1, wherein determining at the processing node whether the request for the domain includes browser authorization data comprises determining at the processing node whether the request for the domain includes browser authorization data as a browser cookie.

8. The method of claim 1, wherein the browser authorization data is a authorization token.

9. The method of claim 1, further comprising:
if the browser configuration data does not comply with the security policy data, then providing a policy information page having compliance instructions for the client browser.

10. The method of claim 1, further comprising:
if the browser configuration data does not comply with the security policy data, then:
determining updates required to bring the browser configuration of the client browser in compliance with the security policy; and
providing a policy information page that includes the updates for the client browser to comply with the security policy.

11. The method of claim 1, further comprising:
if the browser configuration data does not comply with the security policy data, then implementing an automatic update based on the browser configuration data on the client browser, the automatic update including necessary updates to bring the browser configuration of the client browser in compliance with the security policy.

12. The method of claim 1, further comprising:
determining at the processing node whether the request for the domain includes user authentication data; and
wherein the determination of whether the request for the domain includes the browser authorization data is done before the determination of whether the request for the domain includes the user authentication data.

13. The method of claim 1, wherein the configuration page provides a random token to the client browser, the method further comprising:
receiving at the processing node the random token from the client browser;
determining at the processing node the authenticity of the random token; and
if both the random token is authentic and the browser configuration data complies with the security policy data, then providing the browser authorization data to the client browser.

14. A computer implemented method, comprising:
providing from a client browser a request for a domain to a processing node external to a protected network comprising the client browser and the processing node is part of a distributed security system, wherein the domain is external to the protected network and separate from the processing node;
in response to the request:
receiving at the client browser a configuration page including a configuration script;
executing at the client browser the configuration script to generate browser configuration data, the browser configuration data defining a browser configuration of the client browser;
comparing at the client browser the browser configuration data to security policy data associated with the client browser;
determining at the client browser whether the browser configuration data complies with the security policy data based on the comparison; and
if the browser configuration data complies with the security policy data, then providing security policy compliance data to the processing node; and
receiving, at the client browser, browser authorization data after providing the security policy compliance data to the processing node, the browser authorization data is indicative of an acceptable browser configuration level to minimize exploitation of the client browser.

15. The method of claim 14, further comprising:
providing from the client browser the browser authorization data and the request for the domain to the processing node.

16. A network security system, comprising:
a processing node external to network edges of an external system, the processing node comprising:
a configuration processor configured to:
receive a request for a domain from a client browser, wherein the client browser is part of the external system and the domain is external to the external system and separate from the processing node;
determine whether the request for the domain includes browser authorization data;
identify browser configuration data associated with the request for the domain from the client browser;
generate the browser authorization data if the browser configuration data complies with a security policy data associated with the client browser, wherein the browser authorization data is indicative of an acceptable browser configuration level to minimize exploitation of the client browser; and
provide the browser authorization data to the client browser.

17. The method of claim 1, wherein the acceptable browser configuration level comprises a most current version of browser software for the client browser.

18. The method of claim 1, further comprising:
receiving a response to the request from the domain at the processing node;
performing a threat classification on the response by the processing node; and
based on the threat classification, one of allowing distribution of the response, precluding distribution of the response, and allowing distribution of the response after a cleaning process.

19. The method of claim 18, wherein the threat classification comprises one of clean, spyware, malware, undesirable content, innocuous, and unknown.

20. The method of claim 12, wherein the user authentication data is separate from the browser authorization data with the user authentication data indicative of a user's access permission from the protected network.

* * * * *